United States Patent
Kurtz et al.

(10) Patent No.: US 10,812,317 B1
(45) Date of Patent: Oct. 20, 2020

(54) TELECOMMUNICATION NETWORK TROUBLE TICKET SYSTEM

(71) Applicant: Sprint Communications Company L.P., Overland Park, KS (US)

(72) Inventors: Matthew D. Kurtz, Altamonte Springs, FL (US); Brian D. Lushear, Winter Springs, FL (US); Kevin Murphy, Orlando, FL (US)

(73) Assignee: Sprint Communcations Company L.P., Overland Park, KS (US)

( * ) Notice: Subject to any disclaimer, the term of this patent is extended or adjusted under 35 U.S.C. 154(b) by 520 days.

(21) Appl. No.: 14/640,956

(22) Filed: Mar. 6, 2015

(51) Int. Cl.
*H04L 12/24* (2006.01)

(52) U.S. Cl.
CPC ........ *H04L 41/0631* (2013.01); *H04L 41/069* (2013.01); *H04L 41/5074* (2013.01)

(58) Field of Classification Search
CPC .............. H04L 41/0631; H04L 41/069; H04L 41/5074
USPC ........................................................ 709/223
See application file for complete search history.

(56) References Cited

U.S. PATENT DOCUMENTS

| | | | | |
|---|---|---|---|---|
| 5,163,151 A | * | 11/1992 | Bronikowski | G05B 19/052 714/57 |
| 6,108,309 A | * | 8/2000 | Cohoe | H04L 41/145 370/241 |
| 7,890,483 B1 | * | 2/2011 | Aaron | H04L 63/1416 340/526 |
| 2011/0289362 A1 | * | 11/2011 | Stabile | H04L 43/04 714/47.2 |
| 2013/0242724 A1 | * | 9/2013 | Croak | H04L 41/0654 370/225 |
| 2013/0290783 A1 | * | 10/2013 | Bowler | H04L 43/0823 714/25 |
| 2015/0066435 A1 | * | 3/2015 | Basu | H04Q 9/00 702/189 |
| 2015/0195154 A1 | * | 7/2015 | Hevizi | H04L 43/024 706/50 |

* cited by examiner

*Primary Examiner* — Tan Doan (57) ABSTRACT

A system defining fault management actions for a network based on historical reference implemented by at least one computer. The system comprises the alarm process application stored in the memory. When executed by the processor, the alarm process application classifies the plurality of alarms that are stored in the alarm summary table based on which part of the network an alarm is from, scores a priority of each of the plurality of alarms based on the classification and a geographical location of an alarm, and determines a signature for some of the subset of the plurality of alarms to be stored in the matches table, wherein a signature is a set of column and value pairs that occur in alarm fields with an occurrence rate above a predefined threshold.

18 Claims, 4 Drawing Sheets

TELECOMMUNICATION NETWORK TROUBLE TICKET SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. Additionally, more and more electronic devices that did not have network capabilities are becoming network capable. With the rapid development and popularization of network capable electronic devices, communications service providers desire to achieve reliable delivery of information to customers. When a network component in a network that is supported by a communications service provider encounters an issue, a more automated process of recognizing the issue and carrying out steps to solve the issue may be a more efficient and reliable solution than current systems that involve a lot of human interference.

SUMMARY

In an embodiment, a system defining fault management actions for a network based on historical reference implemented by at least one computer is disclosed. The system comprises a data store, a memory, a processor, an alarm summary table stored in the data store and accessed by the processor to store a plurality of alarms, and an alarm ticket table stored in the data store and accessed by the processor to store details of trouble tickets for a subset of the plurality of the alarms. The system further comprises an alarm transaction table stored in the data store and accessed by the processor to store actions predicted by an alarm process application to be taken based on a corresponding signature for some of the subset of the plurality of alarms and a matches table stored in the data store and accessed by the processor to store matches of the corresponding signatures with some of the plurality of alarms. The system further comprises an actions table stored in the data store and accessed by the processor to store historical actions associated with the trouble tickets, an alarm analysis table stored in the data store and accessed by the processor to track effectiveness of matches of signatures with some of the plurality of alarms, and an alarm control table stored in the data store and accessed by the processor to store statuses of new alarms. The system further comprises the alarm process application stored in the memory. When executed by the processor, the alarm process application classifies the plurality of alarms that are stored in the alarm summary table based on which part of the network an alarm is from, and determines a signature for some of the subset of the plurality of alarms to be stored in the matches table, wherein a signature is a set of column and value pairs that occur in alarm fields with an occurrence rate above a predefined threshold. The alarm process application further predicts an action to be performed associated with an alarm based on a corresponding signature for some of the plurality of alarms, wherein the action matches the signature, stores the predicted actions associated with new alarms in the alarm transaction table, grades matches of a predicted action and a corresponding signature for an alarm based on an actual action taken by an operation center for each of the subset of the plurality of alarms, wherein the actual action statuses are stored in the alarm control table, and responsive to a match score falling below a predefined low threshold, disables the match of a predicted action and a corresponding signature, whereby the signatures can be used to predict opening of trouble tickets and actions to resolve new alarms.

In an embodiment, a method of defining fault management actions for a network based on historical reference is disclosed. The method comprises classifying, by a computer, a plurality of alarms based on which part of the network an alarm is from, and determining, by the computer, a signature for some of the subset of the plurality of alarms, wherein a signature is a set of column and value pairs that occur in alarm fields with an occurrence rate above a predefined threshold. The method further comprises predicting, by the computer, an action based on a corresponding signature for some of the plurality of alarms, grading, by the computer, a match of a predicted action and a corresponding signature for an alarm based on an actual action taken by an operation center for some of the plurality of alarms, and responsive to a match score falling below a predefined low threshold, disabling, by the computer, the match.

In an embodiment, a method of defining fault management actions based on historical reference is disclosed. The method comprises determining, by a computer, a signature for some of a plurality of alarms, wherein a signature is a set of column and value pairs that occur in alarm fields with an occurrence rate above a predefined threshold, predicting, by the computer, an action based on a corresponding signature for some of the plurality of alarms, grading, by the computer, a match of a predicted action and a corresponding signature for an alarm based on an actual action taken by an operation center for some of the plurality of alarms, and responsive to a match score falling below a predefined low threshold, disabling, by the computer, the match.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A fault management platform for network activities may be managed by a third party, for example a network device company or a network fault management company, other than a communications service provider that supports a network. The fault management platform may be a software application. When an issue or a fault event occurs at a network component in the network, the network component may generate an alarm. The fault management platform may collect alarms generated by network components in the network, for example by receiving simple network management protocol (SNMP) traps from the network components. Personnel from different organizations that support and/or manage the network, including the network fault management company and the communications service provider, may access the alarms through a user interface and may open trouble tickets for selected alarms. Thousands of alarms may be generated within a short period of time, and typically trouble tickets may not be opened for all alarms. The steps to solve the alarm events may not all be automated. For example, personnel may examine the alarms associated with trouble tickets to decide future steps to solve the alarms. A system involving more automation may be desirable in fault management for network activities. The present disclosure teaches a system and method for defining fault management actions based on historical reference.

For example, alarms may be imported to the system by an alarm process application from the fault management platform or other system into a data store supported by the communications service provider. Updates of the alarms may be periodically imported, for example every five minutes, every ten minutes, or at some other periodic interval. Not all alarms from the fault management platform may be imported each time—changes of alarms and/or alarm states from last import may be imported instead. The alarms may be imported to be stored in an all alarm table in the data store. The alarm process application may be stored in a memory of a server supported by the communications service provider. The alarm process application may be executed by a processor of the server.

A plurality of alarms, e.g., alarms of interest, among all the alarms imported may be extracted by the alarm process application and may be stored in an alarm summary table. For example, the plurality of the alarms may be generated by filtering all the imported alarms based on predefined criteria. Each alarm in the all alarms table may comprise hundreds of fields or columns. Not all columns may be relevant to fault management. Columns that are relevant to fault management may be extracted by the alarm process application and stored in the alarm summary table. Thus, the alarm summary table comprises rows having information derived from a selection of the alarms in the all alarms table (e.g., about 20% of the alarms in the all alarms table) and the rows of the alarm summary table have a selection of the columns of the related alarms in the all alarms table (e.g., about 20% of the columns of the related alarm row in the all alarms table).

The plurality of alarms in the alarm summary table may be classified by the alarm process application based on which part of the network an alarm is from. Alternatively, the plurality of alarms may be classified based on which part of the network an alarm is from by some script called by the alarm process application. Priority of each of the plurality of alarms may be scored by the alarm process application based on the classification and a geographical location of the alarm. A priority score may determine a process priority for an alarm.

A subset of the plurality of alarms in the alarm summary table may be associated with trouble tickets. A signature may be determined by the alarm process application for some of the subset of the plurality of alarms, alarms associated with trouble tickets. A signature may be a single column and value pair or a set of column and value pairs that occur in alarm fields with an occurrence rate above a predefined threshold. Signatures may be utilized by the alarm process application to determine correlation of different column and value pairs to the decision to open trouble tickets for alarms e.g. for newly generated alarms. For example, the alarm process application may determine under what circumstances, for example with which column and value pairs, a trouble ticket may be opened for an alarm. Action(s) may be predicted and/or determined by the alarm process application based on a corresponding signature for each of the alarms associated with trouble tickets since a match between a signature and action(s) may be determined for each of the signatures.

A signature match of a trouble ticket and a corresponding signature may be evaluated and/or scored by the alarm process application based on accuracy of the signature match for some of the alarms associated with trouble tickets. An evaluation of the signature matches may be recorded by a table, for example an alarm analysis table. An action match of a predicted action and a corresponding signature may be evaluated and/or scored by the alarm process application based on an actual action taken by an operation center, e.g., a network operation center, for some of the alarms associated with trouble tickets. An evaluation of the action matches may be recorded by a table, for example the alarm analysis table. In an embodiment, when a predicted action matches an actual action taken by the network operation center, an action match score may be increased by 1. When a predicted action does not match an actual action taken by the network operation center, an action match score may be decreased by 1. When an action match score falls below a predefined low threshold, the action match may be disabled by the alarm process application. Similarly, signature match scores may be maintained for evaluation of signature matches between signatures and trouble tickets.

An actions table may be utilized by the alarm process application to store historical actions associated with the trouble tickets, for example based on signatures. Said in other words, the actions table may store action matches between actions and signatures. Signatures in a match table may comprise an index to one or more actions in the actions table. The alarm transaction table may be used to store actions predicted by the alarm process application to be taken based on a corresponding signature for some of the alarms, e.g., newly generated or imported alarms. The system and method disclosed in the present disclosure may be utilized to automate the process of assigning trouble tickets to alarms and/or assigning actions to alarms associated with trouble tickets. Personnel may supervise certain steps during analyzing and/or processing the alarms, for example scoring of signature matches, scoring of action matches, or another step of analyzing or processing the alarms. In an embodiment, functions mentioned above that are performed by the alarm process application may instead be performed by scripts called by the alarm process application. The use of scripts and tables may be beneficial because when the scripts crash during operation, the scripts may know where it crashed and may resume from the point where the crash occurred.

Figure 1:
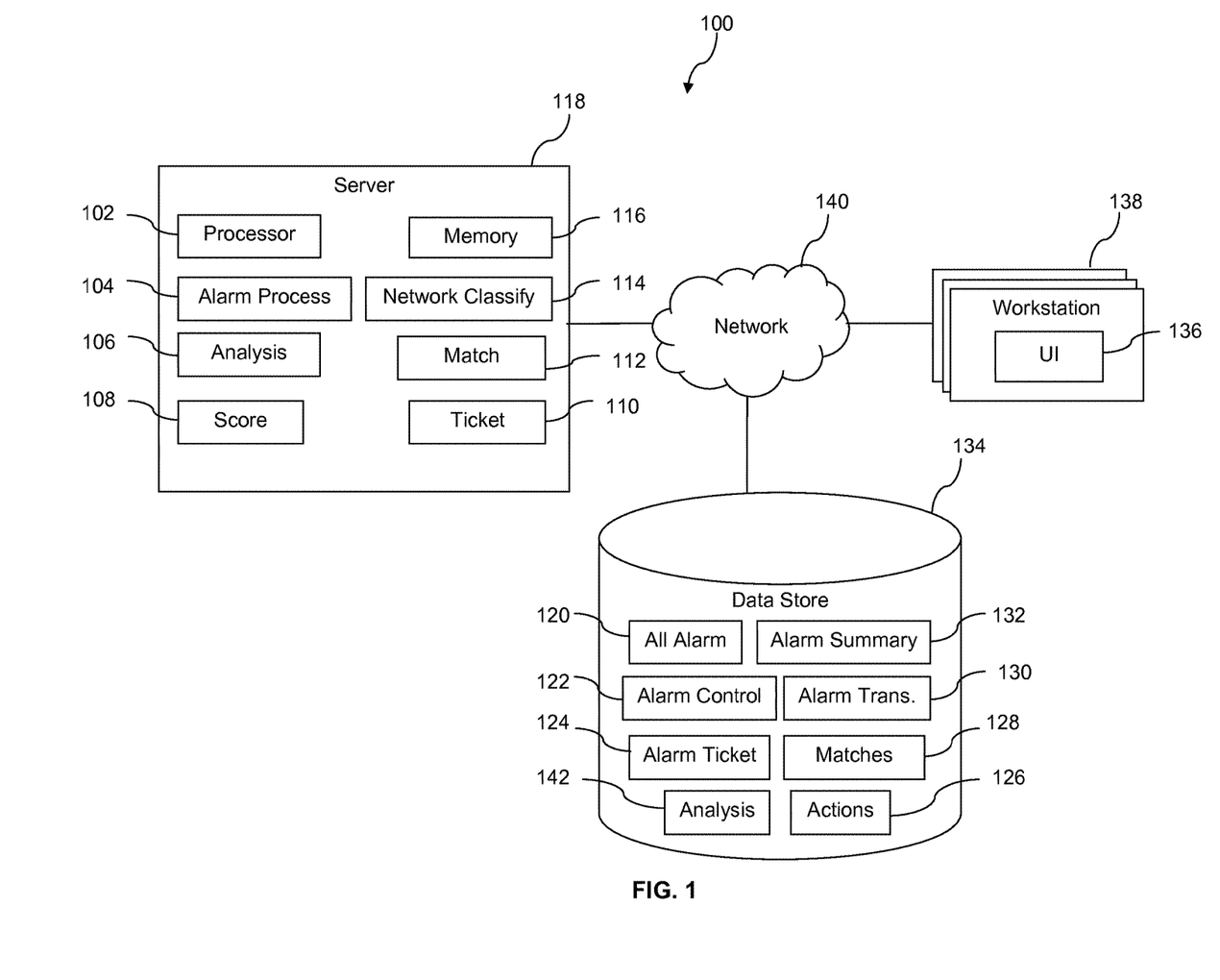
FIG. 1 is an illustration of a communication system according to an embodiment of the disclosure.

Turning now to FIG. 1, a communication system 100 is described. In an embodiment, the communication system 100 comprises a plurality of workstations 138, a data store 134, and a server 118. The server 118 may comprise a processor 102, a memory 116, an alarm process application 104, a network classify script 114, an analysis script 106, a match script 112, a score script 108, and a ticket script 110. The alarm process application 104, the network classify script 114, the analysis script 106, the match script 112, the score script 108, and the ticket script 110 may be stored in the memory 116. A script is a program or sequence of instructions that is interpreted or carried out by another program rather than by a processor, for example as compared to a compiled program. Scripting languages that support scripts comprise Perl, REXX, JavaScript, Tcl/Tk, Python, Erlang, etc. The data store 134 may comprise an all alarm table 120, an alarm summary table 132, an alarm control table 122, an alarm transaction table 130, an alarm ticket table 124, a matches table 128, an actions table 126, and an alarm analysis table 142 or analysis table 142. Data stored in these tables may be stored in some other data structure, for example flat files, linked lists, or some other type of data structure. The workstation 138 may comprise a user interface (UI) 136. The workstation 138 may be communicatively coupled to a network 140 via a wireless or wired communication link. The server 118 and the data store 134 may also be communicatively coupled to the network 140. The network 140 may comprise any combination of private and public networks.

It is understood that the system 100 may comprise any number of workstations 138, any number of data stores 134, and any number of servers 118. The server 118, the workstation 138, and the data store 134 may be server computers. The server 118 and the data store 134 may be located in one computer—for example a server computer, in two different computers—for example, a server computer for the server 118 and another computer for the data store 134, in multiple different computers—for example, multiple server computers for the server 118 and other multiple computers for the data store 134, or in some other combination of computers. When the server 118 and the data store 134 are not located in one computer, the server 118 and the data store 134 may share the same wired or wireless local area network.

The alarm process application 104 may be stored in the memory 116 of the server 118. When executed by the processor 102 of the server 118 or by a software application, the alarm process application 104 may perform a variety of functionality to analyze alarms. Alternatively, the alarm process application 104 may call scripts such as the network classify script 114, the analysis script 106, the match script 112, the score script 108, the ticket script 110, or another script to analyze the alarms. Other scripts may also execute on the processor 102. Logic in the scripts could be implemented in software or firmware. For example, logic implemented in the scripts may be implemented in compiled programs in a variety of programming languages (e.g. C, C++, Java).

In an embodiment, the alarm process application 104 may import alarms from a fault management platform data store (not shown), for example a Netcool data store. The alarms may be imported by the alarm process application 104 into the all alarm table 120. The alarms may have been generated by various network elements of a service provider network and collected by the fault management platform. For example, a network element may be any of a router, a digital switch, a media gateway, a mobile switching center (MSC), a visitor location register (VLR), a mobile management entity (MME), a serving gateway (SGW), a packet data network gateway (PDN-GW), a radius server, an authentication-authorization-and-accounting (AAA) server, a base transceiver station (BTS) or an enhanced Node B (eNB), a short message service (SMS) messaging component, a core network component, a wireless radio access network component, a voicemail component, or some other type of network element. The eNB may alternatively be referred to in some contexts as a base transceiver station or a cell tower. The service provider network is a portion of the network 140.

For example, a base transceiver station in the service provider network may encounter technical difficulties and may generate an alarm for the technical difficulties. The alarm may be collected by the fault management platform, stored in the fault management platform data store, and then imported by the alarm process application 104. Personnel from a variety of organizations that support and/or manage the service provider network may utilize a user interface 136 to examine the alarms. The personnel from the organizations may open trouble tickets for at least some of the alarms. When imported by the alarm process application 104, corresponding trouble ticket information of the alarms may also be imported. For example, a column of an alarm may indicate a trouble ticket number if the alarm is associated with a trouble ticket. Trouble ticket details may be imported into the alarm ticket table 124 and may be indexed by the trouble ticket number of the alarm stored in the all alarm table 120 or alarm summary table 132.

A plurality of alarms, e.g., alarms of interest, among all the alarms imported to the all alarm table 120, may be extracted by the alarm process application 104 and may be placed into the alarm summary table 132. Each alarm may comprise hundreds of fields or columns that characterize an alarm. A column may hold a value. For example, an alarm may comprise a first column with a timestamp value when the alarm was generated, a second column with a network component identification value by which network component the alarm was generated, a third column with a severity level value, a fourth column with notes on the alarm, and other column(s) for other alarm characteristic(s). Not every column of the alarms may be relevant to fault management and so may not be of interest to the alarm process application 104. Said in other words, only part of all the columns of the alarms may be relevant to fault management and so may be of interest to the alarm process application 104. Columns of interest, for example 40 columns out of all 200 columns of an alarm, may be extracted by the alarm process application 104 from all columns of the alarms and may be stored in the alarm summary table 132.

The alarm process application 104 or the network classify script 114 may classify the alarms that are stored in the alarm summary table 132 based on which part of the service provider network an alarm is from. As discussed earlier, the alarms may come from different components of the service provider network. For example, the alarms may be generated by routers, digital switches, media gateways, mobile switching centers, visitor location registers, a radius server, an authentication-authorization-and-accounting server, a base transceiver station, short message service messaging components, core network components, wireless radio access network components, voicemail components, or some other type of network element.

A subset of the plurality of alarms in the alarm summary table 132 may be associated with trouble tickets. Trouble tickets or trouble reports may be used to track identification of, working on, and resolution of a technical problem in the service provider network. In an embodiment, a column of an alarm may indicate a trouble ticket number when the alarm has been assigned with a trouble ticket. When an alarm is not associated with a trouble ticket, the trouble ticket number field may have a null or zero value. Details of the trouble ticket may be stored in the alarm ticket table 124 when the alarms are imported to the all alarm table 120 or when a subset of the alarms are established in the alarm summary table 132. The alarm process application 104 or the score script 108 may score a priority for each of the plurality of alarms in the alarm summary table 132 based on the classification and a geographical location of an alarm. Alternatively, the score script 108 may score a priority for alarms in the alarm summary table 132 that are associated with a trouble ticket. For example, an alarm may comprise a severity level on a scale of 0-5 with 5 being the most severe and 0 being the least severe. Alarms with the same severity level may come from different geographical areas. For example a first alarm with a severity level of 5 may have been generated by a first cell tower or a first base transceiver station in downtown New York, and a second alarm with the same severity level (i.e., 5) may have been generated by a second cell tower in a rural area. The first alarm may be scored by the score script 108 with a higher priority score than the second alarm since more population is likely to be affected by the first cell tower.

The alarm process application 104 or the analysis script 106 may determine a signature for some of the subset of the plurality of alarms stored in the alarm summary table 132, the alarms associated with trouble tickets. A signature may be a single column and value pair or a set of column and value pairs that occur in alarm fields with an occurrence rate no less than a predefined threshold. A signature may be a profile that is strongly correlated with a probability of opening a trouble ticket for an alarm. The signature may be utilized by the alarm process application 104 to determine correlation of different column and value pairs to the decision to open trouble tickets, e.g., for newly generated or imported alarms. For example, a set of 6 field (column) and value pairs (e.g., out of 40 fields) may be used as a signature for some alarm(s) to predict trouble ticket(s) for a newly generated alarm. The alarm transaction table 130 may store action(s) predicted by the alarm process application 104 to be taken based on a corresponding signature for some of the alarms associated with trouble tickets, for example for some of the newly generated alarms.

When an alarm matches more than one signature, the signature with a better signature match score may be chosen to be the matching signature. Alternatively, when an alarm matches more than one signature, the more specific signature may be chosen to be the matching signature under predefined circumstances. A more specific signature may have a larger number of columns in column and value pairs than other signature(s). The matches table 128 may be used by the alarm process application 104 to store signature matches between corresponding signatures and alarms. The analysis table 142 may store evaluation of accuracy of the signature matches between signature and trouble tickets. The evaluation of the signature matches and signature match scores is discussed later on in the present disclosure.

The alarm ticket table 124 may comprise details of trouble tickets, for example what groups worked on a trouble ticket, actions taken by the groups, notes on the alarms, what types of automation are used in the process of solving the alarm events, and/or other information related to alarms. Notes on the alarms may be parsed by the alarm process application 104 or the ticket script 110 in order to determine the details of the alarms. Additionally, detailed information on how the alarm event is solved may be recorded. For example, information on whether or not any personnel have been dispatched to solve the alarm event or to resolve the trouble ticket, whether or not the dispatched personnel went to the site, whether or not the dispatched personnel climbed a cell tower (in the case where the problematic network component is a cell tower), whether or not any network component was reset to solve the alarm event, or another type of detailed information regarding solving the alarm event may be recorded in the alarm ticket table 124.

The alarm ticket table 124 may be utilized by the alarm process application 104 to determine action(s) taken to solve an alarm. Details of a trouble ticket comprise information about which ticket queue the trouble ticket was created in, which ticket queues it moved through, a corresponding trouble ticket severity level, and/or another type of detail. A trouble ticket may be identified in a queue. A queue may be a work queue of a department or work group of a service provider. An organization may solve alarms with trouble tickets in an individual trouble ticket queue. Thus, by identifying which queue(s) the trouble ticket has been involved with, e.g., which queue the trouble ticket was created in or which queue the trouble ticket has been moved through, organizations that created and/or solved the trouble ticket may be identified.

The details of the trouble tickets may be utilized by the alarm process application 104 or the ticket script 110 to determine and/or predict most probable action(s) for an alarm based on a signature. For example, the alarm process application 104 or the ticket script 110 may predict most probable action(s) for an alarm based on its classification and/or a corresponding signature. The ticket script 110 may then store the predicted actions in the alarm actions table 126. Said in other words, the ticket script 110 may store action matches between signatures and actions. For example, a set of actions matching a signature may be "open ticket", "automation", and "route to physical layer team".

The alarm process application 104 or the analysis script 106 may grade or evaluate an action match of a predicted action and a corresponding signature for an alarm, for example on a scale of −25 to +25 with +25 being the most accurate and −25 the least accurate, based on an actual action taken by an operation center for each of the alarms. An action match score ranging from −25 to +25 may be stored in the analysis table 142. The operation center may be a network operation center. For example, when a predicted action matches an actual action for an alarm, an action match score for a match between the predicted action and a corresponding signature may be increased by 1. On the other hand, when a predicted action does not match an actual action for an alarm, an action match score for a match between the predicted action and a corresponding signature may be decreased by 1. Alternatively, when a trouble ticket is resolved, network operations center (NOC) personnel may perform the scoring, e.g., the NOC agent that resolved the subject trouble ticket may score the match and/or the action.

In an embodiment, when new alarms are introduced into the all alarms table 120 (e.g., when a new alarm is generated in the network management tool or by the NOC) a row associated with the new alarm may be created in the alarm control table 122. The alarm control table 122 may track the processing status of alarms. For example, a new alarm may be processed by identifying the portion of the service provider network associated with the alarm, by creating an associated entry in the alarm summary table 132, by calculating a score for the alarm, and other processing. This processing may be considered pre-work or initial work to prepare the system 100 for automated processing of the alarm. The alarm control table 122 may have columns that indicate what portions of the initial processing of an alarm have been completed. The processing identified above may be completed by some of the scripts or applications already described above, for example the alarm process application 104, the network classify script 114, the match script 112, the score script 108, or other scripts. The alarm control table 122 may indicate whether the subject alarm matches a match in the matches table 128. When the alarm does agree with a match in the matches table 128, the alarm control table 122 may indicate whether one or more actions are associated with the subject match in the alarm actions table 126.

Since a specific signature may appear in multiple alarms, the action match score of a predicted action and the signature may be changed multiple times during the process of evaluating the action match. When a match score falls below a predefined low threshold, for example –25, the alarm process application 104 may disable the match. The analysis table 142 may be used to track what percentage a match is accurate over time, for example the percentage of time that someone from the operation center performs the same action as predicted by the alarm process application 104. Similarly, the alarm process application 104 may grade a signature match of a signature and opening a trouble ticket, store a signature match score in the analysis table 142, and/or store accuracy percentages for signature matches over time in the analysis table 142.

A simulator bit may be utilized by the alarm process application 104 to evaluate new matches and/or new actions. For example, a user may enter a new match or signature into the alarm matches table 128 via the user interface 136 on a contingent basis. The alarm process application 104 may enter a new row in the alarm matches table 128 associated with the user input, setting a simulator bit or a simulator field in the new row. When the simulator bit or simulator field is set or active, the system 100 and the alarm process application 104 does not process alarms based on the subject row. In an embodiment, the alarm process application 104 may act on a match and action having the simulator bit set or active by creating associated rows in the alarm transaction table 130, but a simulator bit or simulator field is also set or activated in these rows in the alarm transaction table 130. Rows in the alarm transaction table 130 that have the simulator bit set or the simulator field active are not actually processed by the alarm process application 104—the transactions associated with the rows in the transaction table 130 having the simulator bit set or the simulator field active are not performed.

When the analysis script 142 or other script is performed after a trouble ticket associated with an alarm that matches a signature or match in the alarm matches table 128 that has the simulator bit set or the simulator field active, the subject match and actions are evaluated and the results are collected in the analysis table 142. Simulation results may be compared with actual actions taken by the network operation center to modify signature match scores and/or action match scores. Additionally, staff working in the network operation center may be surveyed to evaluate signature matches and/or action matches. Specific personnel may supervise certain steps during analyzing and/or processing the alarms, for example scoring of signature matches, scoring of action matches, or some other step of analyzing the alarms.

Over a period of time, the match and/or actions that have the simulator bit set or the simulator field active can be evaluated or tested without affecting actual processing of alarms and/or trouble tickets. This may avoid poor quality handling of alarms and/or trouble tickets. The period of evaluation may be about a week, about two weeks, about a month, or some other period of time. The simulator bit and/or simulator field for matches and/or actions can also be used in association with historical processing of alarm data, for example when processing alarms from a previous time interval to train the system 100 and/or to build the alarm matches table 128 and/or the actions table 126.

Figure 2:
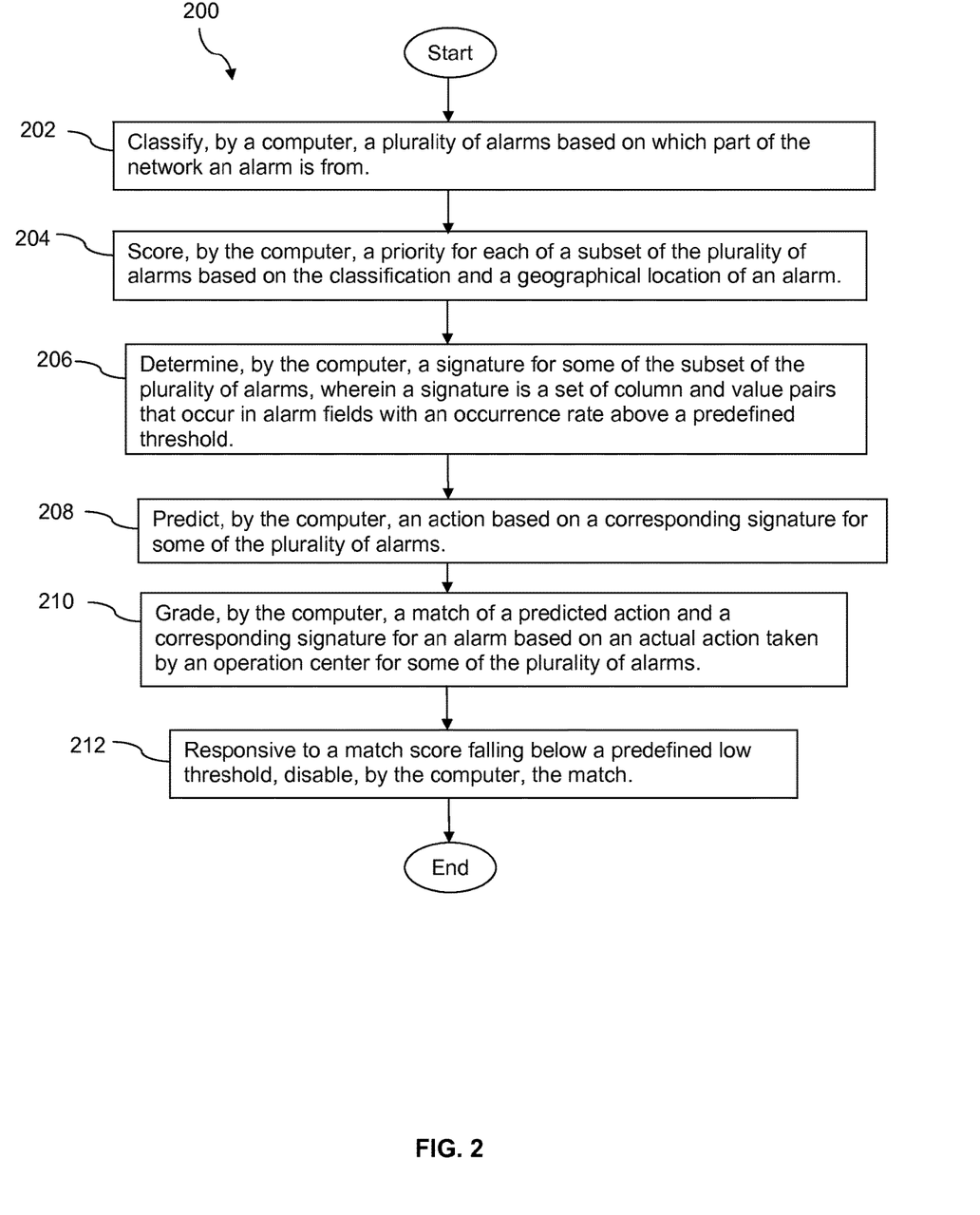
FIG. 2 is a flow chart illustrating a method according to an embodiment of the disclosure.

Turning now to FIG. 2, a method 200 is described. At block 202 a plurality of alarms are classified by a computer based on which part of the service provider network an alarm is from. For example, the plurality of alarms may be classified by the alarm process application 104 or the network classify script 114 based on which part of the service provider network an alarm is from. At block 204, a priority is scored by the computer for each of a subset of the plurality of alarms based on the classification and a geographical location of an alarm. For example, each of the subset of the plurality of alarms may comprise a trouble ticket. A priority for each of the plurality of alarms may be scored by the alarm process application 104 or the score script 108 based on the classification and a geographical location of an alarm.

At block 206, a signature is determined by the computer for some of the subset of the plurality of alarms, wherein a signature is a set of column and value pairs that occur in alarm fields with an occurrence rate above a predefined threshold. For example, a signature may be determined by the alarm process application 104 or the analysis script 106 for some of the alarms. In an embodiment, a signature is a single column and value pair or a set of column and value pairs that occur in alarm fields with an occurrence rate above a predefined threshold. A signature may be a profile that is strongly correlated with a probability of opening a trouble ticket for an alarm. The signature may be utilized by the alarm process application 104 to determine correlation of different column and value pairs to the decision to open trouble tickets. For example, column 1 of the alarms may have values 3, 4, and 5 with the three highest occurrence rates among other values. Value 3 may occur 25% of the time in column 1, value 4 13% of the time, and value 5 6% of the time. When the predefined threshold is 15%, value 3 of column 1 may be a signature for the alarms with value 3 in column 1.

At block 208, an action is predicted by the computer based on a corresponding signature for some of the plurality of alarms. At block 210, a match of a predicted action and a corresponding signature for an alarm is graded by the computer based on an actual action taken by an operation center for some of the plurality of alarms. At block 212, responsive to a match score falling below a predefined low threshold, the match is disabled by the computer.

Figure 3:
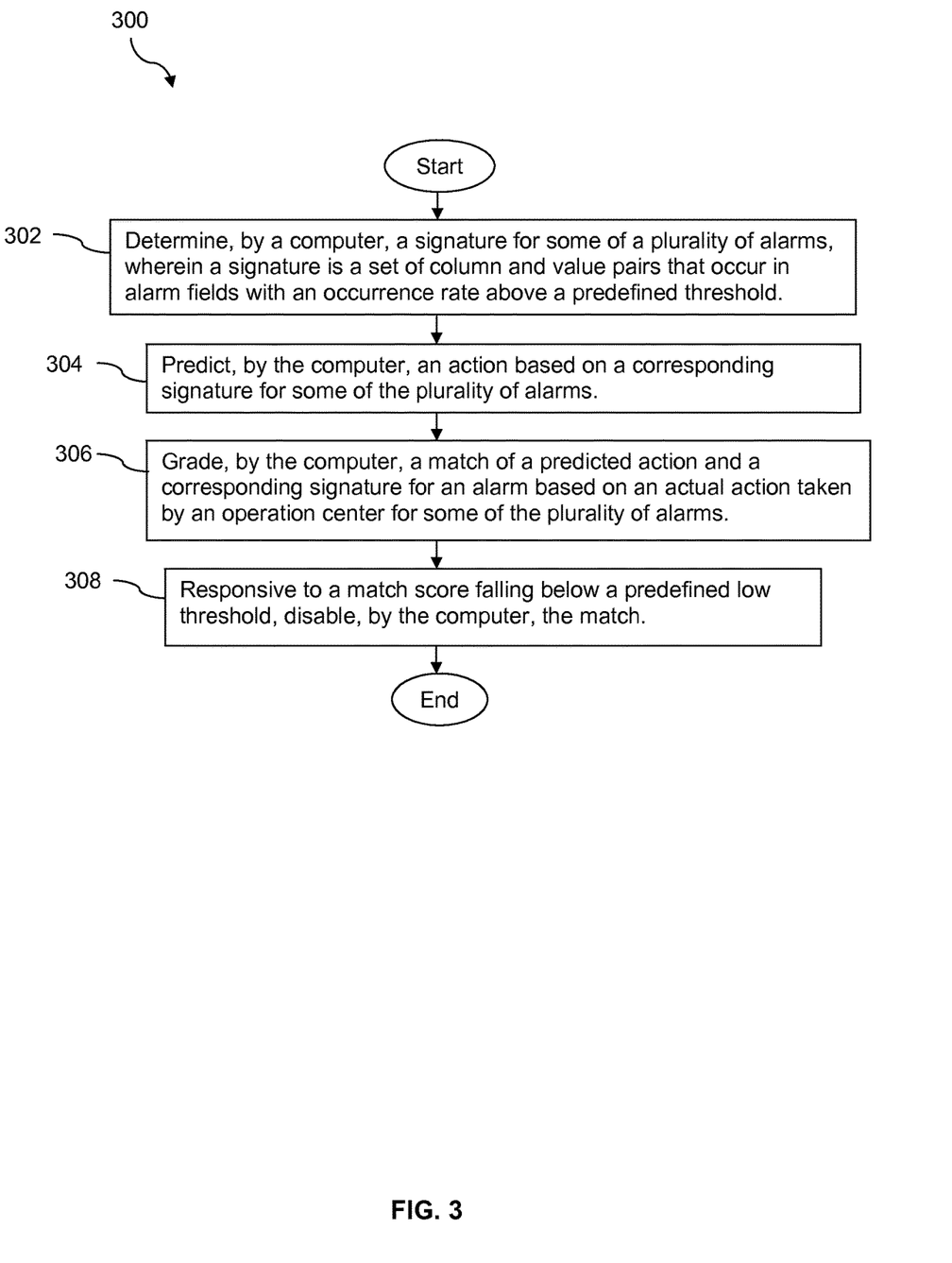
FIG. 3 is a flow chart illustrating another method according to an embodiment of the disclosure.

Turning now to FIG. 3, a method 300 is described. At block 302, a signature is determined by a computer for some of a plurality of alarms, wherein a signature is a set of column and value pairs that occur in alarm fields with an occurrence rate above a predefined threshold. At block 304, an action is predicted by the computer based on a corresponding signature for some of the plurality of alarms. At block 306, a match of a predicted action and a corresponding signature for an alarm is graded by the computer based on an actual action taken by an operation center for some of the plurality of alarms. At block 308, responsive to a match score falling below a predefined low threshold, the match is disabled by the computer.

Figure 4:
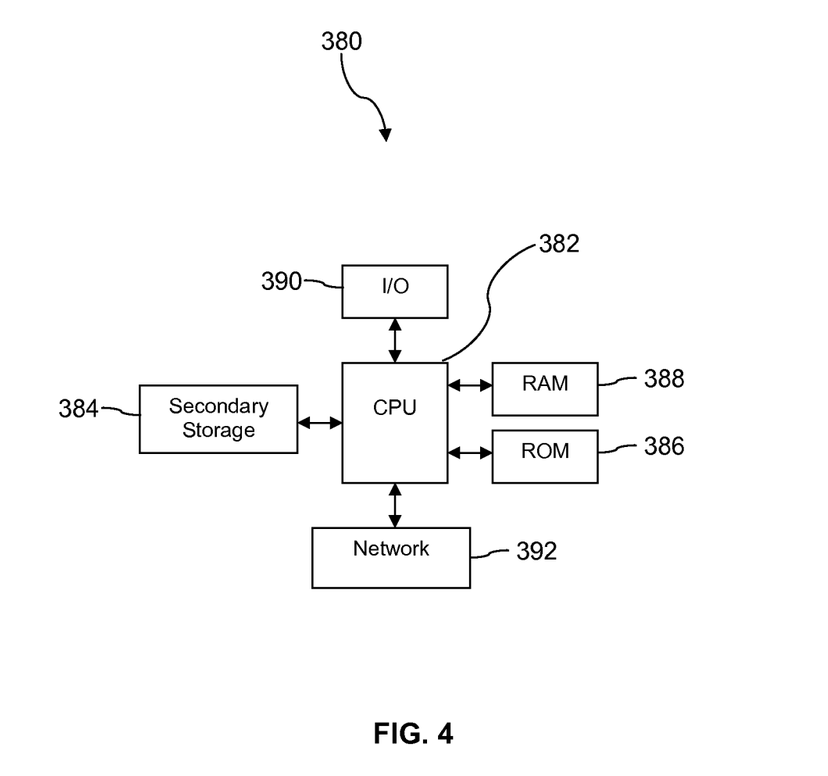
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of defining fault management actions for a network based on historical reference, comprising:
   classifying, by a computer, a plurality of alarms received from a fault management platform based on which network component type an alarm is from;
   determining, by the computer, a signature for some of the subset of the plurality of alarms that are associated with trouble tickets, wherein the signature is a set of column and value pairs that occur in alarm fields with an occurrence rate above a predefined threshold, wherein at least some of the plurality of alarms non-exclusively correspond to the signature, and wherein when an alarm matches more than one signature, the signature with a better match score is chosen to be the matching signature;
   predicting, by the computer, an action based on a corresponding signature for some of the plurality of alarms;
   grading, by the computer, a match of the predicted action and the corresponding signature for an alarm based on an actual action performed by an operation center to solve at least some of the plurality of alarms;
   responsive to a match score of the predicted action falling below a predefined low threshold, disabling, by the computer, the predicted action match;

generating, by the computer via a trouble ticket system, a trouble ticket to resolve an alarm according to the predicted action and the corresponding signature; and performing the predicted action based on the corresponding signature in response to one of the plurality of alarms, wherein the predicted action comprises resetting a network component.

2. The method of claim 1, wherein different network component types include routers, digital switches, media gateways, mobile switching centers (MSCs), visitor location registers (VLRs), a mobile management entity (MME), a serving gateway (SGW), a packet data network gateway (PDN-GW), a radius server, an authentication-authorization-and-accounting (AAA) server, a base transceiver station (BTS), short message service (SMS) messaging components, core network components, wireless radio access network components, or voicemail components.

3. The method of claim 1, further comprising:
grading, by the computer, a match of a simulated action and the corresponding signature for a simulated alarm based on the actual action performed by the operation center to solve at least some of the plurality of alarms, wherein a simulator bit is utilized to indicate the simulated alarm to validate a match between the simulated action and the corresponding signature determined by the alarm process application; and responsive to a match score of the simulated action rising above the predefined threshold, promoting, by the computer, the simulated action to the predicted action.

4. The method of claim 1, wherein details of the trouble tickets comprise information about which queue the trouble tickets were created in, which ticket queues they moved through, and trouble ticket severity, and wherein the details of the trouble tickets are utilized to predict the action for a corresponding alarm.

5. The method of claim 1, further comprising recommending to the operation center, by a user interface of the computer system responsive to predicting the actions based on the corresponding signature for some of the plurality of alarms, the predicted action to perform as the actual action to solve at least some of the plurality of alarms.

6. A method of defining fault management actions based on historical reference, comprising:
determining, by a computer, a signature for some of a plurality of alarms received from a fault management platform, wherein the signature is a set of column and value pairs that occur in fields of alarms associated with trouble tickets with an occurrence rate above a predefined threshold, wherein at least some of the plurality of alarms non-exclusively correspond to the signature, and wherein when an alarm matches more than one signature, the more specific signature is chosen to be the matching signature;

predicting, by the computer, an action based on a corresponding signature for some of the plurality of alarms;

grading, by the computer, a match of the predicted action and the corresponding signature for an alarm based on an actual action performed by an operation center to solve at least some of the plurality of alarms;

responsive to a match score falling below a predefined low threshold, disabling, by the computer, the match;

generating, by the computer via a trouble ticket system, a trouble ticket to resolve one of the plurality of alarms according to the predicted action and the corresponding signature; and performing the predicted action based on the corresponding signature in response to one of the plurality of alarms, wherein the predicted action comprises resetting a network component.

7. The method of claim 6, wherein the plurality of alarms are imported from a fault management platform data store.

8. The method of claim 7, wherein the plurality of alarms are placed in an all alarm table, and wherein columns of interest of the plurality of alarms are extracted from all columns of the plurality of alarms and stored in an alarm summary table.

9. The method of claim 6, wherein an alarm analysis table stores evaluation of accuracy of the matches.

10. The method of claim 9, wherein an alarm control table is utilized by an alarm process application to track process statuses of the plurality of alarms.

11. A system defining fault management actions for a network based on historical reference implemented by at least one computer, comprising:
a data store;
a memory;
a processor;
an alarm summary table stored in the data store and accessed by the processor to store a plurality of alarms received from a fault management platform;
an alarm ticket table stored in the data store and accessed by the processor to store details of trouble tickets for a subset of the plurality of the alarms;
an alarm transaction table stored in the data store and accessed by the processor to store actions predicted by an alarm process application to be taken based on a corresponding signature for some of the subset of the plurality of alarms;
a matches table stored in the data store and accessed by the processor to store matches of the corresponding signatures with some of the plurality of alarms;
an actions table stored in the data store and accessed by the processor to store historical actions associated with the trouble tickets;
an alarm analysis table stored in the data store and accessed by the processor to track effectiveness of matches of signatures with some of the plurality of alarms;
an alarm control table stored in the data store and accessed by the processor to store actual action statuses of new alarms; and
the alarm process application stored in the memory that, when executed by the processor:
classifies the plurality of alarms that are stored in the alarm summary table based on which network component type an alarm is from,
determines a signature for some of the subset of the plurality of alarms that are associated with trouble tickets to be stored in the matches table, wherein the signature is a set of column and value pairs that occur in alarm fields with an occurrence rate above a predefined threshold, and wherein at least some of the plurality of alarms non-exclusively correspond to the signature,
predicts an action to be performed associated with an alarm based on a corresponding signature for some of the plurality of alarms, wherein the action matches the signature,
stores the predicted action associated with new alarms in the alarm transaction table,
grades matches of the predicted action and the corresponding signature for an alarm based on an actual action performed by an operation center to solve at least some of the subset of the plurality of alarms, wherein the actual action statuses are stored in the alarm control table, responsive to a match score falling below a predefined low threshold, disables the match of the predicted action and the corresponding signature, grades a match of a simulated action and the corresponding signature for a simulated alarm based on the actual action performed by the operation center to solve at least some of the plurality of alarms, wherein a simulator bit is utilized to indicate the simulated alarm to validate a match between the simulated action and the corresponding signature determined by the alarm process application, responsive to a match score of the simulated action rising above the predefined threshold, promotes the simulated action to the predicted action, generates, via a trouble ticket system, a trouble ticket to resolve an alarm according to the predicted action and the corresponding signature, and performs the predicted action based on the corresponding signature in response to one of the plurality of alarms, wherein the predicted action comprises resetting a network component.

12. The system of claim 11, wherein different network component types that are used to classify the plurality of alarms include routers, digital switches, media gateways, mobile switching centers (MSCs), visitor location registers (VLRs), a radius server, an authentication-authorization-and-accounting (AAA) server, a base transceiver station (BTS), short message service (SMS) messaging components, core network components, wireless radio access network components, or voicemail components.

13. The system of claim 11, wherein the alarm analysis table stores an evaluation of accuracy of the matches of the signatures with some of the plurality of alarms.

14. The system of claim 11, wherein the trouble tickets are identified in a queue, and wherein an organization solves alarms with trouble tickets in an individual trouble ticket queue.

15. The system of claim 11, wherein the alarm control table is utilized by the alarm process application to track action statuses of the subset of the plurality of alarms.

16. The system of claim 11, wherein when an alarm matches more than one signature, the signature with a better match score is chosen to be the matching signature.

17. The system of claim 11, wherein when an alarm matches more than one signature, the more specific signature is chosen to be the matching signature.

18. The system of claim 11, wherein the alarm process application further scores a priority of at least some of the subset of the plurality of alarms based on a geographic location from which the alarm originated.

* * * * *